US009651697B2

(12) United States Patent
Wang et al.

(10) Patent No.: US 9,651,697 B2
(45) Date of Patent: May 16, 2017

(54) NOISE ATTENUATION USING A DIPOLE SPARSE TAU-P INVERSION

(71) Applicant: CGG SERVICES SA, Massy (FR)

(72) Inventors: Ping Wang, Sugar Land, TX (US); Suryadeep Ray, Houston, TX (US); Zhigang Zhang, Houston, TX (US)

(73) Assignee: CGG SERVICES SAS, Massy (FR)

( * ) Notice: Subject to any disclaimer, the term of this patent is extended or adjusted under 35 U.S.C. 154(b) by 0 days.

(21) Appl. No.: 14/908,301

(22) PCT Filed: Mar. 24, 2015

(86) PCT No.: PCT/IB2015/000626
§ 371 (c)(1),
(2) Date: Jan. 28, 2016

(87) PCT Pub. No.: WO2015/145261
PCT Pub. Date: Oct. 1, 2015

(65) Prior Publication Data
US 2016/0223698 A1    Aug. 4, 2016

Related U.S. Application Data

(60) Provisional application No. 61/971,574, filed on Mar. 28, 2014.

(51) Int. Cl.
*G06F 19/00* (2011.01)
*G01V 1/36* (2006.01)
(52) U.S. Cl.
CPC ........ *G01V 1/364* (2013.01); *G01V 2210/244* (2013.01); *G01V 2210/324* (2013.01); *G01V 2210/47* (2013.01)

(58) Field of Classification Search
CPC ........ G06Q 30/08; G06Q 40/00; G01V 3/083; G01V 3/12
(Continued)

(56) References Cited

U.S. PATENT DOCUMENTS

2009/0136104 A1* 5/2009 Hajian ................ G01R 33/56
382/128

FOREIGN PATENT DOCUMENTS

WO    00/67045 A2    11/2000
WO    2010/120505 A2    10/2010

OTHER PUBLICATIONS

International Search Report in related International Application No. PCT/IB2015/000626, mailed Oct. 26, 2015.
(Continued)

*Primary Examiner* — Edward Raymond
(74) *Attorney, Agent, or Firm* — Patent Portfolio Builders PLLC (57) ABSTRACT

An input seismic data set is obtained, and a first inversion is conducted on a first frequency filtered input seismic data set across all slowness values in the plurality of slowness values using an inversion matrix with dipole modulation containing a plurality of Tau-p operators and a plurality of dipole terms to transform the first frequency filtered input seismic data set from a time domain to a Tau-p domain having a plurality of first inversion Tau-p coefficients. Each Tau-p coefficient associated with one of the plurality of slowness values. The first inversion Tau-p coefficients are used to identify a subset of slowness values from the plurality of slowness values, and iterative sparse Tau-p inversion using the identified subset of slowness values is performed. The input seismic data set is modified to generate a noise attenuated seismic data set based on the iterative sparse Tau-p inversion.

20 Claims, 4 Drawing Sheets

(58) Field of Classification Search
USPC .......................................... 702/17, 182–185
See application file for complete search history.

(56) References Cited

OTHER PUBLICATIONS

Written Opinion of the International Searching Authority in related International Application No. PCT/IB2015/000626, mailed Oct. 26, 2015.

N. Gulunay, "F-X Domain Least-squares Tau-P and Tau-Q", 60th Annual International Meeting, SEG, 1990, Expanded Abstracts, pp. 1607-1610.

N. Gulunay et al., "Coherency Enhancement on 3D Seismic Data by Dip Detection and Dip Selection", Annual Meeting, San Antonio, Texas, SEG, 2007, pp. 2625-2630.

D. Hampson, "Inverse Velocity Stacking for Multiple Elimination", 66th Annual International Meeting, SEG, Expanded Abstracts, 1986, pp. 422-424.

P. Herrmann et al., "De-aliased, High-Resolution Radon Transforms", 70th Annual International Meeting, SEG, Expanded Abstracts, 2000, pp. 1953-1056.

P. Hugonnet et al., "Beyond Aliasing Regularisation by Plane Event Extraction", EAGE 69th Conference & Exhibition, Longon, UK, Jun. 11-14, 2007, pp. 114-117.

C. Peng, "Attenuation of Turn Noise in Marine Towed Streamer Data with an Anti-leakage Tau-P Method", 76th EAGE Conference & Exhibition, Amsterdam RAI, The Netherlands, Jun. 16-19, 2014.

G. Poole, "Multi-dimensional Coherency Driven Denoising of Irregular Data", 73rd EAGE Conference & Exhibition Incorporating SPE EUROPEC 2011, Vienna, Austria, May 23-26, 2011, pp. 1-6.

M.D. Sacchi, "Fast High Resolution Parabolic Radon Transform", SEG Expanded Abstracts, 1999, pp. 1-4.

W.A. Schneider et al., "3D Beam Streering—A Powerful Signal Enhancement Tool for Noisy 3D Data", 66th Annual International Meeting, SEG, Expanded Abstracts, 1969, pp. 1450-1453.

R.H.Tatham, "Multidimensional Filtering of Seismic Data", Proceedings of the IEEE, Oct. 1984, vol. 72, No. 10, pp. 1357-1375.

D. Trad et al., "Latest Views of the Sparse Radon Transform", Geophysics, Jan.-Feb. 2003, vol. 68, No. 1, pp. 386-399.

S. Xu et al., "Antileakage Fourier Transform for Seismic Data Regularization in Higher Dimensions", Geophysics, Society of Exploration Geophysicists, Nov.-Dec. 2010, vol. 75, No. 6, pp. WB113-WB120.

* cited by examiner

NOISE ATTENUATION USING A DIPOLE SPARSE TAU-P INVERSION

CROSS REFERENCE TO RELATED APPLICATIONS

This application claims priority and benefit from U.S. Provisional Patent Application No. 61/971,574, filed Mar. 28, 2014, for "Noise Attenuation Using a Dipole Sparse Tau-p Inversion," the entire content of which is incorporated in its entirety herein by reference.

TECHNICAL FIELD

Embodiments of the subject matter disclosed herein generally relate to methods and systems for seismic data processing and, more particularly, to mechanisms and techniques for noise attenuation in seismic signals.

BACKGROUND

The ambient environments in which seismic surveys are conducted contain noise that needs to be attenuated or removed from the seismic data. Irregular sampling and spatial aliasing of seismic data pose a challenge to noise attenuation. High-resolution Radon transform (or sparse Radon inversion) is effective in handling irregularly sampled and spatially aliased seismic data. In particular, the Tau-p, (τ,p), transform has been used as a powerful seismic data processing tool for many years. For example, slant-stack has been used for directional decomposition of seismic signals, and an anti-leakage Tau-p transform (ALTP), which is analogous to the anti-leakage Fourier transform (ALFT), iteratively extracts the slowness of the most dominant energy until the remainder is smaller than a predefined threshold or the maximum number of iterations is reached. This method has been modified to apply a semblance weighting to the energy of the Tau-p model and then uses it as a criterion for event selection, honoring events with better coherence.

The linear Tau-p transform was proposed to make the Tau-p transform theoretically invertible. However, in practice, discrete spatial sampling and limited spatial aperture of seismic data still rendered this method non-invertible. The linear Radon transform was then proposed to make the Tau-p transform invertible using the power of least squares fitting of the input data with a Tau-p model. This method has been modified with semblance weighting. Linear Radon transform methods need to be applied iteratively and, therefore, are very expensive. Also, these methods suffer from energy leakage among different slowness values; thus, the resolution is often low.

To mitigate energy leakage among different slowness values, which causes smearing and damage to events, a high-resolution Radon transform (or sparse Radon inversion) has been proposed that tries to fit the input data with a spiky (sparse) Tau-p model. This method handles aliasing and resolution in a non-iterative way. Thus, it is not only more accurate with higher resolution, but also more efficient.

SUMMARY

Exemplary embodiments are directed to systems and methods that utilize a new sparse Radon inversion scheme that combines a dipole term with sparse Tau-p inversion. In combination with sparse Tau-p inversion, a dipole term is introduced into the inversion matrix. The dipole term acts as a time-differential operator and tends to weight the high-frequency and low-dip events; therefore, it effectively attenuates low-frequency and high-dip noise while preserving the primaries better than the conventional sparse Radon inversion method.

In one embodiment of a method for noise reduction of seismic data, an input seismic data set is obtained, and a first inversion on a first frequency filtered input seismic data set across all slowness values in the plurality of slowness values is conducted using an inversion matrix with dipole modulation containing a plurality of Tau-p operators and a plurality of dipole terms to transform the first frequency filtered input seismic data set from a time domain to a Tau-p domain containing a plurality of first inversion Tau-p coefficients. Each Tau-p coefficient is associated with one of the plurality of slowness values.

In one embodiment, the inversion matrix with dipole modulation includes a plurality of matrix terms, and each term is a product of one of a plurality of Tau-p operators and one of a plurality of dipole terms. In one embodiment, the inversion matrix with dipole modulation contains one dipole term for each one of the plurality of slowness values. In one embodiment, each dipole term includes a slowness dependent time-differential operator to attenuate low-frequency and high-dip noise in the input seismic data set while preserving a primary signal in the input seismic data set.

In order to generate the first frequency filtered seismic data set, frequencies are removed from the input seismic data set that are above a pre-defined frequency. In one embodiment, the pre-defined frequency is about 10 Hz.

The first inversion Tau-p coefficients are used to identify a subset of slowness values from the plurality of slowness values. In one embodiment, first inversion Tau-p coefficients associated with most dominant slowness values in the Tau-p representation are identified. For example, the most dominant slowness values in combination account for at least about 90% of all energy in input seismic data set.

Iterative sparse Tau-p inversion is performed using the identified subset of slowness values. This includes conducting a second inversion on a second frequency filtered input seismic data set across the identified subset of slowness values using the inversion matrix with dipole modulation to transform the second frequency filtered input seismic data set from the time domain to the Tau-p domain comprising a plurality of second inversion Tau-p coefficients. The plurality of second inversion Tau-p coefficients is used to define a weight function.

In addition, a third inversion is conducted on a full-bandwidth input seismic data set across the identified subset of slowness values using the weight function and the inversion matrix with dipole modulation to transform the full-bandwidth input seismic data set from the time domain to the Tau-p domain comprising a plurality of third inversion Tau-p coefficients. Dominant third inversion Tau-p coefficients are identified from the plurality of third inversion Tau-p coefficients. The identified dominant third inversion Tau-p coefficients are transformed back to the time domain, and the transformed identified dominant third inversion Tau-p coefficients are subtracted from the full-bandwidth input seismic data set to generate an updated residual input seismic data set.

In one embodiment, the iterative sparse Tau-p inversion using the subset of slowness values is repeated a pre-determined number of iterations. Alternatively, the iterative sparse Tau-p inversion using the subset of slowness values is repeated iteratively until a pre-determined percentage of all energy in the input seismic data set is removed from the final residual input seismic data set.

The input seismic data set is modified to generate a noise attenuated seismic data set based on the iterative sparse Tau-p inversion. This modification and generation includes combining the third inversion Tau-p coefficients from all iterative sparse Tau-p inversions using the identified subset of slowness values. A p-dependent bandpass filter is applied to the combined third inversion Tau-p coefficients to generate bandpass filtered combined third inversion Tau-p coefficients, and an inverse Tau-p transform is applied to the bandpass filtered combined third inversion Tau-p coefficients to generate the noise attenuated seismic data set.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to local activity taking place within the area of a seismic survey. However, the embodiments to be discussed next are not limited to this configuration, but may be extended to other arrangements that include regional activity, conventional seismic surveys, etc.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Exemplary embodiments of systems and methods utilize sparse Radon inversion of frequency filtered seismic data that includes a dipole term in a sparse Tau-p inversion. The resulting dipole sparse Tau-p inversion reliably derives a sparse ($\tau$, p) representation or model in Tau-p space of the input seismic data that includes almost all the signal while preventing most undesired noise from being modeled. The dipole sparse Tau-p inversion better preserves seismic signals compared to the conventional or monopole sparse Tau-p inversion.

Methods that use forward Anti-Leakage Tau-p Transform (ALTP) or its derivatives to remove undesirable noise from seismic data first transform the input data, $P(t; x_i)$, from a time domain into the Tau-p domain, where $\tau$ represents time and p represents slowness, i.e., slowness, inverse of velocity, of the medium through which the seismic signals pass. This transformation yields a plurality of Tau-p space coefficients, $M(\tau; p_j)$. Each coefficient can be calculated by the following equation:

$$M(\tau; p_j) = \frac{1}{n} \sum_f \sum_i e^{-i2\pi f(\tau - x_i p_j)} \sum_t P(t; x_i) e^{i2\pi ft}, \quad (1)$$

where i=1, 2 . . . , n, with n equal to the total number of traces located at position $x_i$, and j=1, 2, . . . , m, with m equal to the total number of slowness values.

In the next step, certain criteria, for example, largest amplitude or coherence, are applied to select one or a few of the Tau-p coefficients representing the most desired components of the input seismic data signal in the current iteration, and those coefficients are then inverse $\tau$–p transformed back into the time domain. The transformed time domain data are subtracted from the original input seismic data set in the time, t–x, domain. This process of forward Tau-p domain transformation, coefficient selection, inverse Tau-p transformation of the selected coefficient to the time domain and subtraction of inverse transformed time domain data from the original input seismic data set is repeated iteratively until most of the desired or primary seismic signal is removed. The remainder from the original input seismic data set is treated as the noise model. This remainder is directly or adaptively subtracted from the input seismic data set to obtain the final denoised output.

In most cases, only a small fraction of all of the Tau-p coefficients that are forward calculated are actually needed to model the input data; therefore, this process generates a sparse Tau-p representation of the input data. The success of these methods can be attributed to the fact that seismic signal is often sparse in the $\tau$–p domain while most noise is not. In general, forward ALTP takes out energy one p at a time, resulting in an expensive method for removing noise.

As an alternative to the forward ALTP method, a sparse Tau-p representation of input data is found by a least squares inversion. In the least squares inversion, Equation 1 is reformatted to form an inverse problem, $$\begin{pmatrix} P(f, x_1) \\ P(f, x_2) \\ \vdots \\ P(f, x_n) \end{pmatrix} = A \begin{pmatrix} M(f, p_1) \\ M(f, p_2) \\ \vdots \\ M(f, P_m) \end{pmatrix}, \quad (2)$$

where $$A = \begin{pmatrix} e^{-i2\pi f x_1 p_1} & e^{-i2\pi f x_1 p_2} & \cdots & e^{-i2\pi f x_1 p_m} \\ e^{-i2\pi f x_2 p_1} & e^{-i2\pi f x_2 p_2} & \cdots & e^{-i2\pi f x_2 p_m} \\ \cdots & \cdots & & \cdots \\ e^{-i2\pi f x_n p_1} & e^{-i2\pi f x_n p_2} & \cdots & e^{-i2\pi f x_n p_m} \end{pmatrix}. \quad (3)$$

Conventionally, a conjugate-gradient least-squares inversion could have been applied to obtain the optimal Tau-p model, $M=M(f, p_j)$, representing the input data (signal and noise). However, the Tau-p model obtained this way is not sparse, and this method suffers from the events leakage among different p values. With sparse Tau-p inversion, input data are fit using many p values at a time with a sparse constraint that is more efficient and reduces leakage of energy among different p values. Hereafter, the inversion scheme in Equation 2 is referred to as a monopole sparse inversion.

Exemplary embodiments utilize a two-step process to remove noise from an input seismic data set. These two steps include a first step that is a first full-rank inversion over high-cut filtered data, i.e., a frequency filtered seismic data set, using all p values and a second step that is an iterative sparse Tau-p inversion using a subset of slowness values identified in the first step. This second step includes a low-rank inversion over full-bandwidth data for dominant p values. This two-step process address two issues with the input seismic data set, aliasing in the sparse seismic data at higher frequencies and the existence of weak events within the input seismic data set, in order to make the inversion schemes successful for removing noise from sparse seismic data. Regarding aliasing, in marine towed-streamer acquisition, for example, both the inline and crossline sampling are typically not dense enough to prevent aliasing of the high frequency content of seismic data. To overcome this spatial sampling issue, along with the low-rank optimization described above to reduce the model parameters, the first step is conducted in which the Tau-p transform is performed using the high-cut filtered data to get an initial result. In one embodiment, the high cut filtered data include seismic data filtered to remove data above about 10 Hz. The result of this initial Tau-p transformation is then used to guide the inversions in the second step by defining a subset of the Tau-p coefficients in the sparse Tau-p representation associated with a subset of slowness values. In particular, the subset of slowness values are used in the second inversion during the second step to generate sparse Tau-p coefficients that define a weight function such that the subset of the Tau-p coefficients when modified by the weight function and transformed by the inversion matrix with dipole modulation fits the input seismic data set. This is then used in a third inversion during the second part. The third inversion is conducted at higher frequencies, i.e., over the full-bandwidth input seismic data.

Regarding the weaker events in the seismic data, the sparse inversion and low-rank optimization strategy naturally favours stronger events in the seismic data. As a result, this optimization strategy is less responsive to weak events. A potential solution is to use weaker sparseness, i.e., more p values, and more iterations to better recover weak events. However, increasing p values and iterations results in a more expensive process and loses the merits of a sparse inversion. Exemplary embodiments use an external iteration to first extract modelled data containing the stronger events, i.e., higher energy events, from the input seismic data set. The resulting residual seismic data set is the original seismic data set minus these stronger events and contains the weaker, i.e., lower energy, events. This multiple-step strategy facilitates the use of less expensive parameters at each external iteration, effectively retaining weak events while maintaining a low overall cost.

Figure 1:
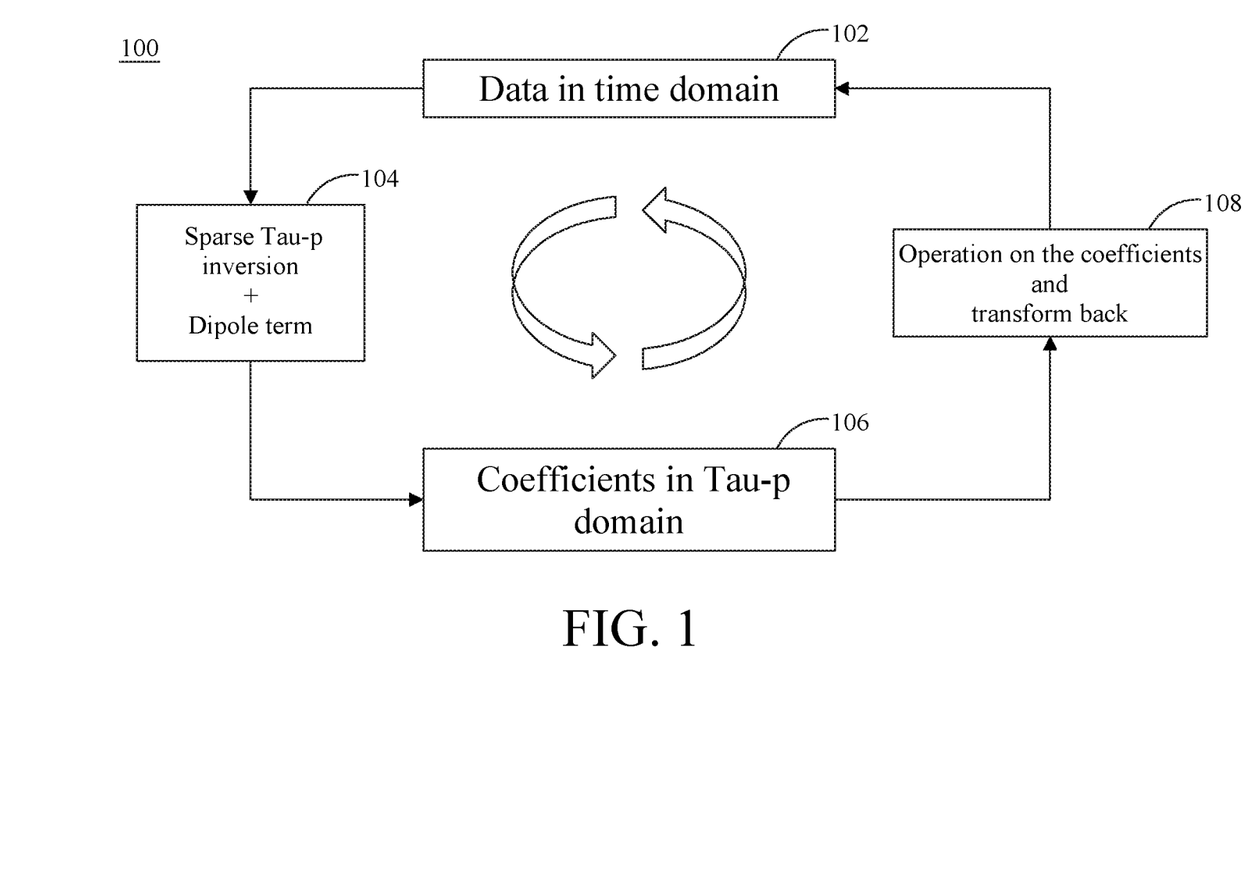
FIG. 1 illustrates a simplified flowchart used for dipole sparse Tau-p inversion to remove noise from an input seismic data set.

Referring initially to FIG. 1, exemplary embodiments follow an iterative loop 100 for removing noise from an input seismic data signal. This iterative loop can be executed a single time, for example in the initial frequency filtered step to identify and remove the highest energy portions of the input seismic data set, or multiple times. When run multiple times, each iterative removes the highest remaining energy from a remaining residual seismic data set. The number of iterations can be pre-determined or can be based on the amount of energy that is to be accounted for in the input seismic data set. For example, the iterations are continued until 90%, 95% or more of the energy in the input seismic data set is accounted for. Each iteration begins with data in the time domain 102. These data can be the input seismic data set or a residual seismic data set. A sparse Tau-p inversion containing a dipole term is then run on time domain data 104. This results in a plurality of Tau-p coefficients in the Tau-p domain 106. An operation is performed that identifies the desired Tau-p coefficients, e.g., the Tau-p coefficients that when taken together account for 90% of the energy in the original time domain data for this iteration. These identified Tau-p coefficients are then transformed back to the time domain 108, where this transformed time domain representation is subtracted from the original time domain data that was used for this iteration. This results in residual time domain data, which is used for the subsequent iteration.

In general, the basis of the Tau-p transform is not orthogonal. As a result, the transform requires a large p-range and small p-increment, i.e., the model space is large, especially for high dimensions, to represent the input seismic data accurately. Conversely, the input seismic data set is sparse. This results in a discrepancy between the large model space and the small data space, and the inversion is prohibitively expensive, unstable and non-unique. Therefore, exemplary embodiments utilize a low-rank optimization approach to reduce the model parameters. Initially, the input seismic data are high cut-filtered to remove frequencies above a pre-determined initial frequency. In one embodiment, this pre-determined initial frequency is about 10 Hz.

Having filtered out the higher frequencies, a full-rank inversion is performed over the high cut-filtered seismic data using all p values. From this initial inversion, the most dominant p values are identified along with the associated Tau-p coefficients. The identified most dominant p values represent only a subset of all p values. This subset of p are then used in all subsequent low-rank, full-bandwidth inversions. This results in a stable algorithm having a significantly reduced cost. In addition, a sparse Tau-p representation of the input signal is obtained in which most of the noise is not modeled.

While the sparse inversion scheme effectively removes different types of noise from seismic input seismic data, sometimes the seismic signal can be damaged. This damage occurs when a desired portion of the seismic signal is not modelled by the sparse Tau-p process and remains in the residual seismic data set, effectively being removed as noise. In order to prevent this damage to the seismic signal, a dipole term is introduced into the inversion scheme. This dipole term is given by:

$$D_j = e^{-i\pi f d}\sqrt{(p_{max})^2 - (p_j)^2} - e^{i\pi f d}\sqrt{(p_{max})^2 - (p_j)^2}, \quad (4)$$

where $p_{max}$ is the maximum slowness and d is a small depth. For example, this small depth can be about 1 m. The dipole term functions as a time-differential operator, and tends to zoom in the details of the seismic data during the least squares inversion.

A key to the dipole sparse Tau-p inversion is to find a best sparse Tau-p model, M, that fits the input data, P, when reverse Tau-p transformed with a dipole modulation. This dipole term is used to modify the inversion matrix A in Equation 3 to following modified inversion matrix:

$$A' = \begin{pmatrix} D_1 e^{-i2\pi fx_1 p_1} & D_2 e^{-i2\pi fx_1 p_2} & \cdots & D_m e^{-i2\pi fx_1 p_m} \\ D_1 e^{-i2\pi fx_2 p_1} & D_2 e^{-i2\pi fx_2 p_2} & \cdots & D_m e^{-i2\pi fx_2 p_m} \\ \cdots & \cdots & & \cdots \\ D_1 e^{-i2\pi fx_n p_1} & D_2 e^{-i2\pi fx_n p_2} & \cdots & D_m e^{-i2\pi fx_n p_m} \end{pmatrix}. \quad (5)$$

By replacing matrix A in Equation 2 with A' in Equation 5, the result is a dipole sparse inversion scheme as illustrated by the following:

$$\begin{pmatrix} P(f, x_1) \\ P(f, x_2) \\ \vdots \\ P(f, x_n) \end{pmatrix} = A' \begin{pmatrix} M(f, p_1) \\ M(f, p_2) \\ \vdots \\ M(f, p_m) \end{pmatrix}. \quad (6)$$

where f is frequency, $x_i$ is the $i^{th}$ receiver/shot location, $p_j$ is the $j^{th}$ slowness, $e^{-i2\pi fx_i p_j}$ is the reverse Tau-p operator, and $D_j$ is the dipole term equivalent to a p-dependent time-differential operator. The dipole sparse inversion does a better job preserving the primary signal compared with the monopole sparse inversion. Therefore, the dipole sparse inversion is used for all inversions. For a small depth, d, and a low frequency, f, Equation 4 can be approximated as:

$$D_j \approx -i2\pi f d \sqrt{p_{max}^2 - p_j^2} \quad (7)$$

which tends to weigh the high frequency and low-dip events; therefore, it effectively attenuates low-frequency and high-dip noise while preserving the desirable primary energy in the input seismic data set.

Figure 2:
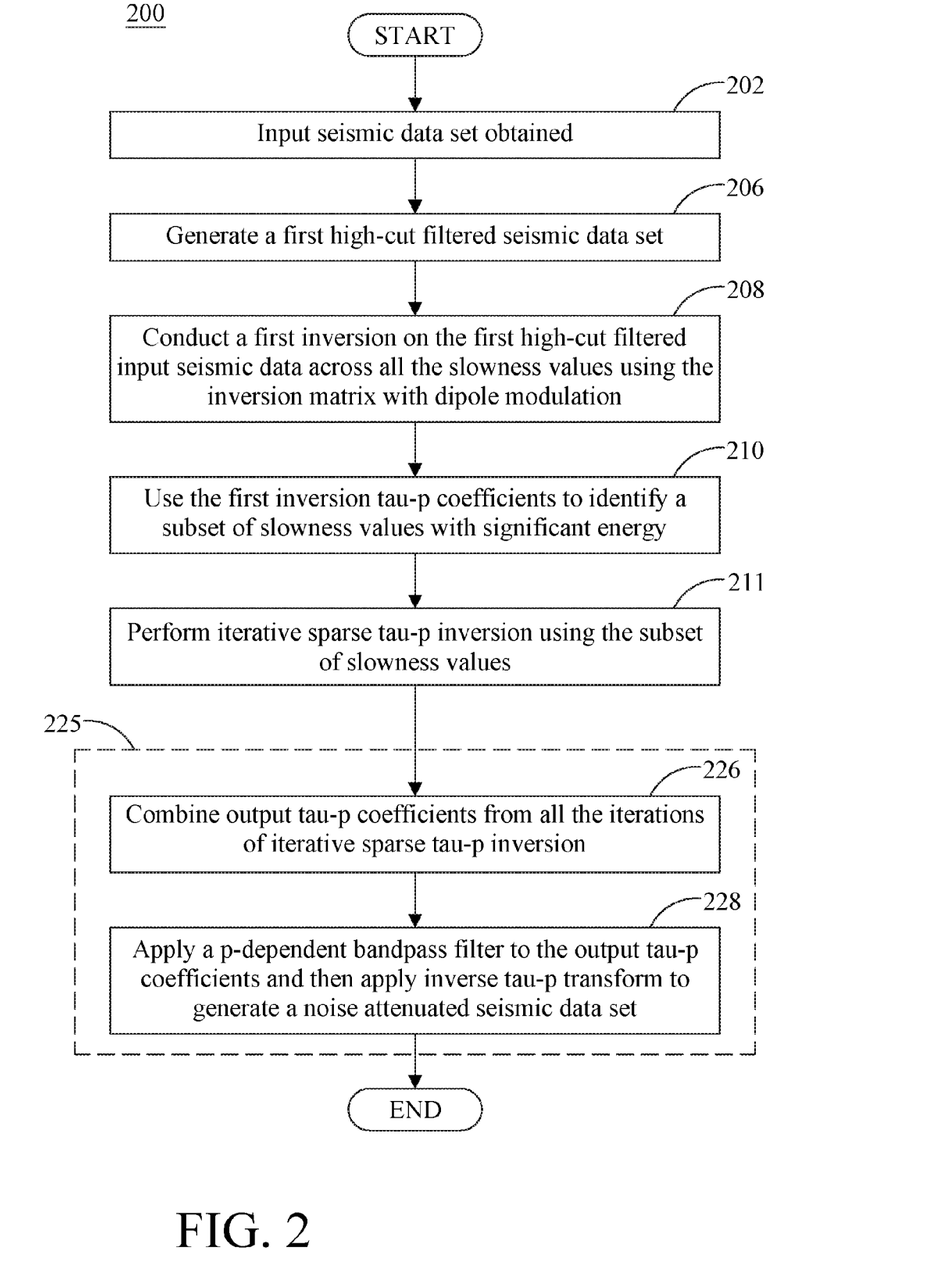
FIG. 2 is a detailed flowchart of an embodiment of a method for removing noise from an input seismic data set in accordance with the present invention.

Referring to FIG. 2, in one exemplary embodiment, a method for noise reduction of seismic data using the dipole sparse Tau-p inversion 200 is illustrated. An input seismic data set is obtained 202. A suitable input seismic data set can be used that has been obtained using any type of seismic survey available and known in the art.

A first frequency filtered seismic data set, preferably a first high-cut filtered seismic data set, is generated from the input seismic data set 206 by removing frequencies from the input seismic data set that are above a pre-defined frequency. In one embodiment, this pre-defined frequency is about 10 Hz. A first inversion is conducted on the first frequency filtered input seismic data set across all slowness values in the plurality of slowness values using the inversion matrix with dipole modulation comprising a plurality of Tau-p operators and a plurality of dipole terms 208 to transform the frequency filtered input seismic data set from a time domain to a Tau-p domain containing a plurality of first inversion Tau-p coefficients. Each Tau-p coefficient is associated with one of the plurality of slowness values. The first inversion Tau-p coefficients are used to identify a subset of the slowness values from the plurality of slowness values having significant energy 210.

Using the first inversion Tau-p coefficients to identify the subset of slowness values includes identifying first inversion Tau-p coefficients associated with the most dominant slowness values in the Tau-p representation. In one embodiment, the most dominant slowness values, in combination, account for at least about 90% of all energy in input seismic data set. In order to define the first residual input seismic data set, the Tau-p coefficients associated with the slowness values in the identified subset of slowness values, i.e., the most dominant slowness values, are transformed back to the time domain, and the transformed Tau-p coefficients are subtracted from the input seismic data set to create residual input seismic data set.

An iterative sparse Tau-p inversion using the subset of slowness values is performed 211. Each iteration results in a new updated residual input seismic data set until the final iteration, which yields a final residual input seismic data set that is used in the iterations. In addition, each iteration results in the identification of one or more Tau-p coefficients from a full-bandwidth inversion of the current updated residual input seismic data set associated such that these identified Tau-p coefficients are associated with highest energy for that inversion. In one embodiment, iterative sparse Tau-p inversion is repeated a pre-determined number of iterations. Alternatively, iterative sparse Tau-p inversion is repeated iteratively until a pre-determined percentage of all energy in the input seismic data set is removed from the final residual input seismic data set. This predetermined percentage of all energy from the input seismic data set can be up to about 90% to about 95% or more of all of the input seismic data set energy.

Once a determination is made that no more iterations are to be conducted, a noise attenuated seismic data set is generated based on the iterative sparse Tau-p inversion 225. In one embodiment, all of the Tau-p coefficients from all the iterations of the iterative sparse Tau-p inversion using the subset of slowness values are combined 226. A p-dependent bandpass filter is applied to the combined output Tau-p coefficients to generate bandpass filtered combined Tau-p coefficients, and an inverse Tau-p transform to the bandpass filtered combined Tau-p coefficients to generate the noise attenuated seismic data set 228.

Figure 3:
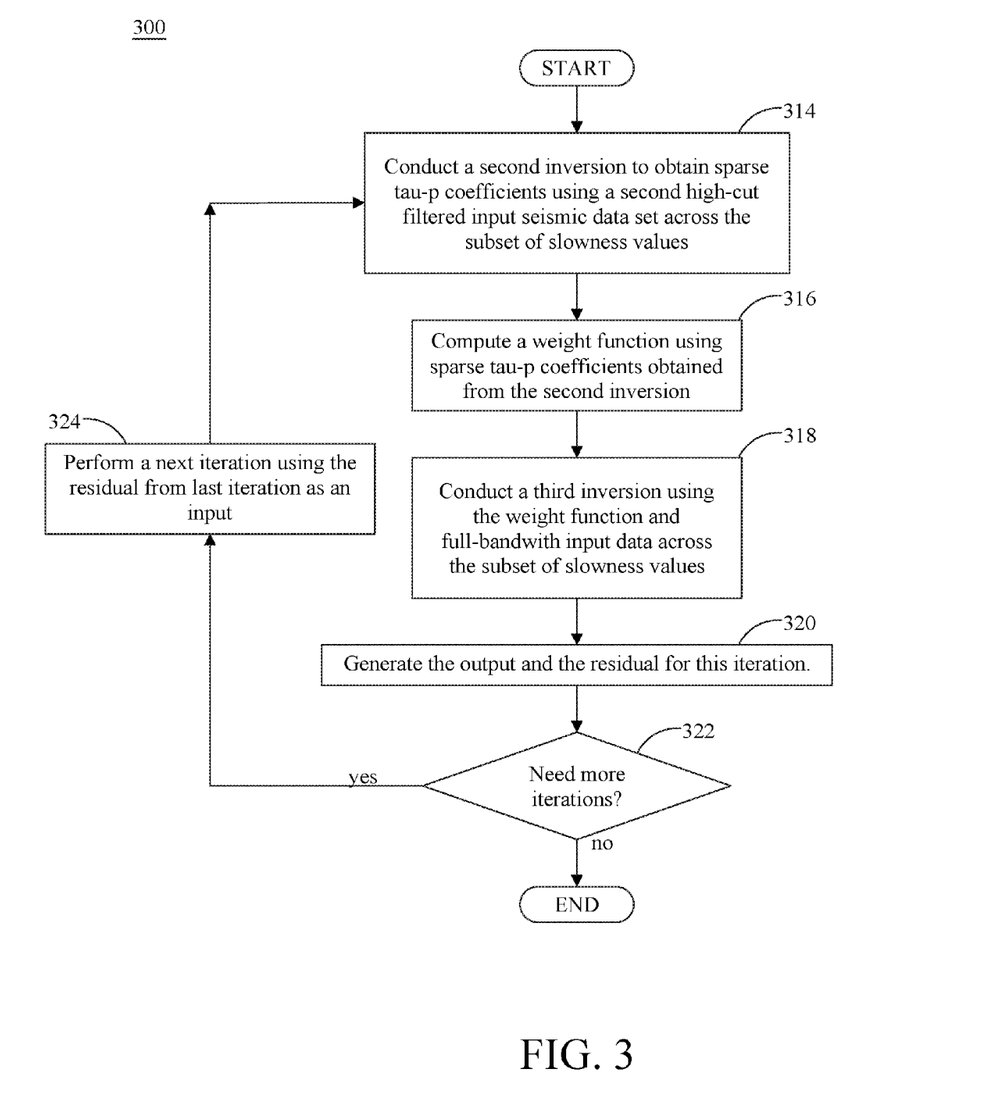
FIG. 3 is a flowchart of an embodiment of iterative weighted sparse Tau-p inversion for use in accordance with the present invention.

Referring to FIG. 3, an exemplary embodiment of an iterative sparse Tau-p inversion using the subset of slowness values 300 is illustrated. A second inversion conducted using the inversion matrix with dipole modulation comprising a plurality of Tau-p operators and a plurality of dipole terms and a second filtered input seismic data set, preferably a second high-cut filtered input seismic data set across the subset of slowness values to obtain sparse Tau-p coefficients 314. The first and second filtered input seismic data sets can be the same or can be different. In one embodiment, the second input seismic data set is determined from sampling theory and depends on the highest frequency or channel spacing in the input seismic data set.

From this plurality of sparse Tau-p coefficients, a domain weight function that is proportional to a selected order of the energy for each Tau-p coefficients is computed 316. A third inversion is conducted using the inversion matrix with dipole modulation comprising a plurality of Tau-p operators and a plurality of dipole terms, the computed weight function and full-band-width input data across the subset of slowness values 318. The output of the third inversion, which is one or more third inversion Tau-p coefficients having the highest energy values, and the residual, which is the current full-bandwidth input data set used in the current third inversion minus the slowness values associated with the third inversion Tau-p coefficients for this inversion, are generated for the third iteration 320. The residual can also be referred to as an updated input seismic data set, and this residual is used in the next iteration of the sparse Tau-p inversion using the subset of slowness values 324.

The second and third inversions can be repeated multiple times iteratively to generate a final residual input seismic data set. Therefore, a determination is made regarding whether or not to perform additional iterations 322. In one embodiment, the second and third inversions are repeated a pre-determined number of iterations. Alternatively, the second and third inversions are repeated iteratively until a pre-determined percentage of all energy in the input seismic data set is removed from the final residual input seismic data set. This predetermined percentage of all energy from the input seismic data set can be up to about 90% to about 95% or more of all of the input seismic data set energy. If another round of iterations is selected, the next iteration of the second inversion using the residual from the last iteration as input 324.

If another iteration is not to be performed, then the method proceeds to the generation of the noise attenuated output seismic data set 225 (FIG. 2). The output from the iterations is a plurality of Tau-p coefficients or a plurality of third inversion Tau-p coefficients that were generated at each iteration of the third inversion.

Methods and systems in accordance with exemplary embodiments can be hardware embodiments, software embodiments or a combination of hardware and software embodiments. In one embodiment, the methods described herein are implemented as software. Suitable software embodiments include, but are not limited to, firmware, resident software and microcode. In addition, exemplary methods and systems can take the form of a computer program product accessible from a computer-usable or computer-readable medium providing program code for use by or in connection with a computer, logical processing unit or any instruction execution system. In one embodiment, a machine-readable or computer-readable medium contains a machine-executable or computer-executable code that when read by a machine or computer causes the machine or computer to perform a method for removing or attenuating noise in seismic data in accordance with exemplary embodiments and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages.

As used herein, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums and include non-transitory computer-readable mediums. Suitable computer-readable mediums include, but are not limited to, a semiconductor or solid state memory, magnetic tape, a removable computer diskette, a random access memory (RAM), a read-only memory (ROM), a rigid magnetic disk and an optical disk. Suitable optical disks include, but are not limited to, a compact disk-read only memory (CD-ROM), a compact disk-read/write (CD-R/W) and DVD.

Figure 4:
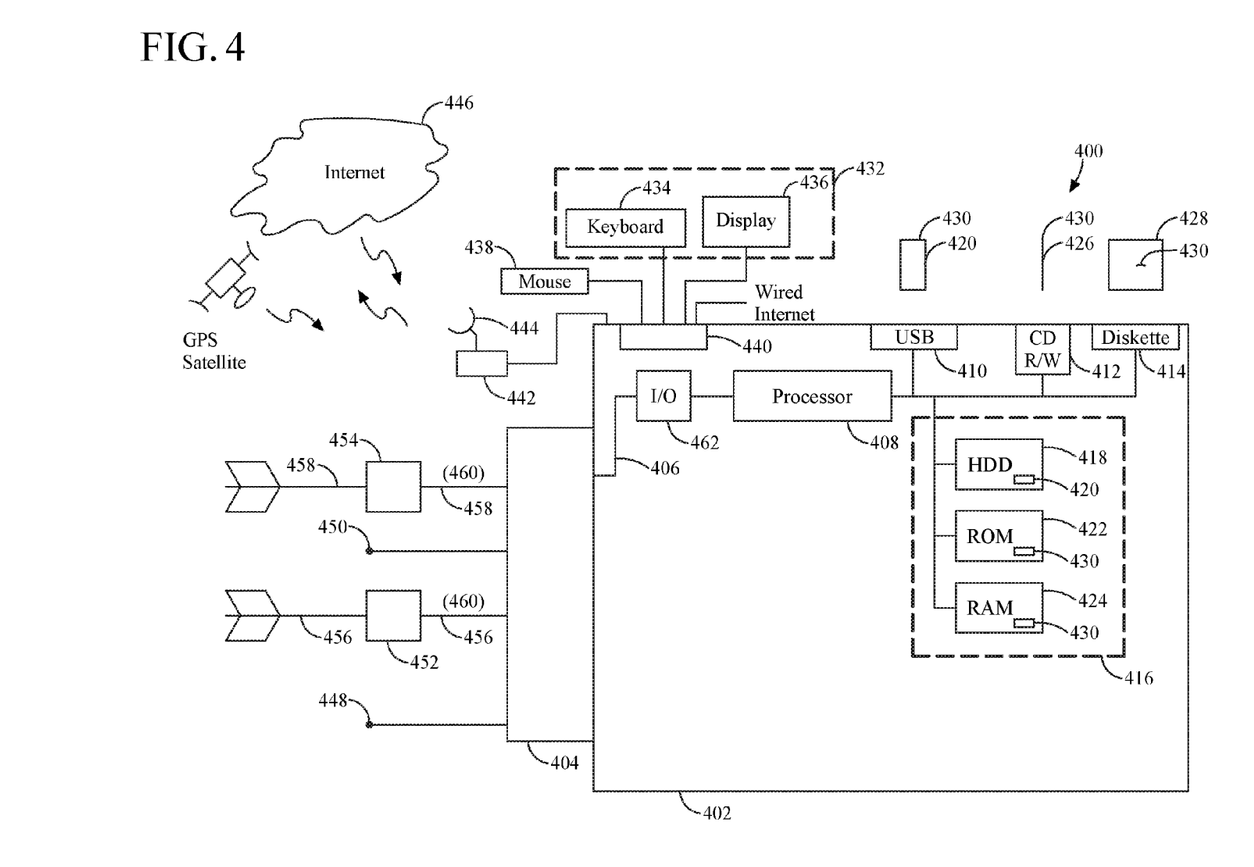
FIG. 4 illustrates an exemplary data processing device or system which can be used to implement the methods.

In one embodiment, a computing device for performing the calculations as set forth in the above-described embodiments may be any type of computing device capable of processing and communicating seismic data associated with a seismic survey. An example of a representative computing system capable of carrying out operations in accordance with these embodiments is illustrated in FIG. 4. System 400 includes, among other items, server 402, source/receiver interface 404, internal data/communications bus (bus) 406, processor(s) 408, universal serial bus (USB) port 410, compact disk (CD)/digital video disk (DVD) read/write (R/W) drive 412, floppy diskette drive 414 (though less used currently, many servers still include this device), and data storage unit 416.

Data storage unit 416 itself can comprise hard disk drive (HDD) 418 (these can include conventional magnetic storage media, but, as is becoming increasingly more prevalent, can include flash drive-type mass storage devices 420, among other types), ROM device(s) 422 and random access memory (RAM) devices 424. Usable with USB port 410 is flash drive device 420, and usable with CD/DVD R/W device 412 are CD/DVD disks 426 (which can be both read and write-able). Usable with diskette drive device 414 are floppy diskettes 428. Each of the memory storage devices, or the memory storage media (418, 420, 422, 424, 426, and 428, among other types), can contain parts or components, or in its entirety, executable software programming code (software) 430 that can implement part or all of the portions of the method described herein. Further, processor 408 itself can contain one or different types of memory storage devices (most probably, but not in a limiting manner, RAM memory storage media 424) that can store all or some of the components of software 430.

In addition to the above-described components, system 400 also includes user console 432, which can include keyboard 434, display 436, and mouse 438. All of these components are known to those of ordinary skill in the art, and this description includes all known and future variants of these types of devices. Display 436 can be any type of known display or presentation screen, such as liquid crystal displays (LCDs), light emitting diode displays (LEDs), plasma displays, cathode ray tubes (CRTs), among others. User console 432 can include one or more user interface mechanisms such as a mouse, keyboard, microphone, touch pad, touch screen, voice-recognition system, among other interactive inter-communicative devices.

User console 432, and its components if separately provided, interface with server 402 via server input/output (I/O) interface 440, which can be an RS232, Ethernet, USB or other type of communications port, or can include all or some of these, and further includes any other type of communications means, presently known or further developed. System 400 can further include communications satellite/global positioning system (GPS) transceiver device 442, to which is electrically connected at least one antenna 444 (according to an embodiment, there would be at least one GPS receiver-only antenna, and at least one separate satellite bi-directional communications antenna). System 400 can access the Internet 446, either through a hard-wired connection, via I/O interface 440 directly, or wirelessly via antenna 444, and transceiver 442.

Server 402 can be coupled to other computing devices via one or more networks. Server 402 may be part of a larger network configuration as in a global area network (GAN) (e.g., Internet 446), which ultimately allows connection to various landlines.

According to a further embodiment, system 400, being designed for use in seismic exploration, will interface with one or more sources 448, 450 and one or more receivers 452, 454. As further previously discussed, sources 448, 450 and receivers 452, 454 can communicate with server 402 either through an electrical cable, or via a wireless system that can communicate via antenna 444 and transceiver 442 (collectively described as communications conduit 460).

According to further exemplary embodiments, user console 432 provides a means for personnel to enter commands and configuration into system 400 (e.g., via a keyboard, buttons, switches, touch screen and/or joy stick). Display device 436 can be used to show: source/receiver 456, 458 position; visual representations of acquired data; source 448, 450 and receiver 452, 454 status information; survey information; and other information important to the seismic data acquisition process. Source and receiver interface unit 404 can receive the seismic data from receiver 452, 454 though communication conduit 460 (discussed above). Source and receiver interface unit 404 can also communicate bi-directionally with sources 448, 450 through the communication conduit 460. Excitation signals, control signals, output signals and status information related to source 448, 450 can be exchanged by communication conduit 460 between system 400 and source 448, 450.

System 400 can be used to implement the methods described above associated with the calculation of the induced source shot gather. Hardware, firmware, software or a combination thereof may be used to perform the various steps and operations described herein. According to an exemplary embodiment, software 430 for carrying out the above-discussed steps can be stored and distributed on multimedia storage devices.

The disclosed exemplary embodiments provide a computing device, software and method for calculating the induced source shot gather. It should be understood that this description is not intended to limit the invention. On the contrary, the exemplary embodiments are intended to cover alternatives, modifications and equivalents, which are included in the spirit and scope of the invention. Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software, or firmware tangibly embodied in a computer-readable storage medium for execution by a geo-physics dedicated computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for noise reduction of seismic data, the method comprising:
   obtaining an input seismic data set acquired using one or more seismic sources and receivers;
   conducting a first inversion on a first frequency filtered input seismic data set across all slowness values in the plurality of slowness values using an inversion matrix with dipole modulation comprising a plurality of Tau-p operators and a plurality of dipole terms to transform the first frequency filtered input seismic data set from a time domain to a Tau-p domain comprising a plurality of first inversion Tau-p coefficients, each Tau-p coefficient associated with one of the plurality of slowness values;
   using the first inversion Tau-p coefficients to identify a subset of slowness values from the plurality of slowness values;
   performing iterative sparse Tau-p inversion using the identified subset of slowness values; and
   modifying the input seismic data set to generate a noise attenuated seismic data set based on the iterative sparse Tau-p inversion.

2. The method of claim 1, wherein the inversion matrix with dipole modulation comprises a plurality of matrix terms, each term comprising a product of one of a plurality of Tau-p operators and one of a plurality of dipole terms.

3. The method of claim 1, wherein the inversion matrix with dipole modulation contains one dipole term for each one of the plurality of slowness values.

4. The method of claim 1, wherein each dipole term comprises a slowness dependent time-differential operator to attenuate low-frequency and high-dip noise in the input seismic data set while preserving a primary signal in the input seismic data set.

5. The method of claim 1, further comprising generating the first frequency filtered seismic data set by removing frequencies from the input seismic data set that are above a pre-defined frequency.

6. The method of claim 5, wherein the pre-defined frequency is about 10 Hz.

7. The method of claim 1, wherein using the first inversion Tau-p coefficients to identify the subset of slowness values further comprises identifying first inversion Tau-p coefficients associated with most dominant slowness values in the Tau-p representation.

8. The method of claim 7, wherein the most dominant slowness values in combination account for at least about 90% of all energy in input seismic data set.

9. The method of claim 1, wherein performing iterative sparse Tau-p inversion using the identified subset of slowness values comprises:
   conducting a second inversion on a second frequency filtered input seismic data set across the identified subset of slowness values using the inversion matrix with dipole modulation to transform the second frequency filtered input seismic data set from the time domain to the Tau-p domain comprising a plurality of second inversion Tau-p coefficients; and
   using the plurality of second inversion Tau-p coefficients to define a weight function.

10. The method of claim 9, wherein performing iterative sparse Tau-p inversion using the identified subset of slowness values further comprises:
    conducting a third inversion on a full-bandwidth input seismic data set across the identified subset of slowness values using the weight function and the inversion matrix with dipole modulation to transform the full-bandwidth input seismic data set from the time domain to the Tau-p domain comprising a plurality of third inversion Tau-p coefficients.

11. The method of claim 10, wherein performing iterative sparse Tau-p inversion using the subset of slowness values further comprises:
    identifying dominant third inversion Tau-p coefficients from the plurality of third inversion Tau-p coefficients;
    transforming the identified dominant third inversion Tau-p coefficients back to the time domain; and subtracting the transformed identified dominant third inversion Tau-p coefficients from the full-bandwidth input seismic data set to generate an updated residual input seismic data set.

12. The method of claim 1, wherein iterative sparse Tau-p inversion using the subset of slowness values is repeated a pre-determined number of iterations.

13. The method of claim 1 wherein iterative sparse Tau-p inversion using the subset of slowness values is repeated iteratively until a pre-determined percentage of all energy in the input seismic data set is removed from the final residual input seismic data set.

14. The method of claim 10, wherein generating the noise attenuated seismic data set further comprises:
  combining third inversion Tau-p coefficients from all iterative sparse Tau-p inversions using the identified subset of slowness values;
  applying a p-dependent bandpass filter to the combined third inversion Tau-p coefficients to generate bandpass filtered combined third inversion Tau-p coefficients; and
  applying an inverse Tau-p transform to the bandpass filtered combined third inversion Tau-p coefficients to generate the noise attenuated seismic data set.

15. A computer device configured to reduce noise in seismic data, the computer device comprising:
  an interface configured to receive an input seismic data set acquired using one or more seismic sources and receivers; and
  a processor connected to the interface and configured to,
    conduct a first inversion on a first frequency filtered input seismic data set across all slowness values in the plurality of slowness values using an inversion matrix with dipole modulation comprising a plurality of Tau-p operators and a plurality of dipole terms to transform the first frequency filtered input seismic data set from a time domain to a Tau-p domain comprising a plurality of first inversion Tau-p coefficients, each Tau-p coefficient associated with one of the plurality of slowness values;
    use the first inversion Tau-p coefficients to identify a subset of slowness values from the plurality of slowness values;
    perform iterative sparse Tau-p inversion using the identified subset of slowness values; and
    modify the input seismic data set to generate a noise attenuated seismic data set based on the iterative sparse Tau-p inversion.

16. The computer device of claim 15, wherein the processor in performing iterative sparse Tau-p inversion using the identified subset of slowness values is further configured to:
  conduct a second inversion on a second frequency filtered input seismic data set across the identified subset of slowness values using the inversion matrix with dipole modulation to transform the second frequency filtered input seismic data set from the time domain to the Tau-p domain comprising a plurality of second inversion Tau-p coefficients; and
  use the plurality of second inversion Tau-p coefficients to define a weight function.

17. The computer device of claim 16, wherein the processor in performing iterative sparse Tau-p inversion using the identified subset of slowness values is further configured to conduct a third inversion on a full-bandwidth input seismic data set across the identified subset of slowness values using the weight function and the inversion matrix with dipole modulation to transform the full-bandwidth input seismic data set from the time domain to the Tau-p domain comprising a plurality of third inversion Tau-p coefficients.

18. The computer device of claim 17, wherein the processor in performing iterative sparse Tau-p inversion using the identified subset of slowness values is further configured to:
  identify dominant third inversion Tau-p coefficients from the plurality of third inversion Tau-p coefficients;
  transform the identified dominant third inversion Tau-p coefficients back to the time domain; and
  subtract the transformed identified dominant third inversion Tau-p coefficients from the full-bandwidth input seismic data set to generate an updated residual input seismic data set.

19. The computer device of claim 17, wherein the processor in generating the noise attenuated seismic data set is further configured to:
  combine third inversion Tau-p coefficients from all iterative sparse Tau-p inversions using the identified subset of slowness values;
  apply a p-dependent bandpass filter to the combined third inversion Tau-p coefficients to generate bandpass filtered combined third inversion Tau-p coefficients; and
  apply an inverse Tau-p transform to the bandpass filtered combined third inversion Tau-p coefficients to generate the noise attenuated seismic data set.

20. A non-transitory computer-readable storage medium containing a computer-readable code that when read by a computer causes the computer to perform a method for noise reduction of seismic data, the method comprising:
  obtaining an input seismic data set acquired using one or more seismic sources and receivers;
  conducting a first inversion on a first frequency filtered input seismic data set across all slowness values in the plurality of slowness values using an inversion matrix with dipole modulation comprising a plurality of Tau-p operators and a plurality of dipole terms to transform the first frequency filtered input seismic data set from a time domain to a Tau-p domain comprising a plurality of first inversion Tau-p coefficients, each Tau-p coefficient associated with one of the plurality of slowness values;
  using the first inversion Tau-p coefficients to identify a subset of slowness values from the plurality of slowness values;
  performing iterative sparse Tau-p inversion using the identified subset of slowness values; and
  modifying the input seismic data set to generate a noise attenuated seismic data set based on the iterative sparse Tau-p inversion.

* * * * *